US012500031B2

(12) United States Patent
Lin et al.

(10) Patent No.: US 12,500,031 B2
(45) Date of Patent: Dec. 16, 2025

(54) MAGNETIC COMPONENT AND MAGNETIC BODY THEREOF

(71) Applicant: CYNTEC CO., LTD., Hsinchu (TW)

(72) Inventors: Wen-Yu Lin, Hsinchu (TW); Mo-Yang Lu, Hsinchu (TW); Kai-Yi Fong, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 898 days.

(21) Appl. No.: 17/521,891

(22) Filed: Nov. 9, 2021

(65) Prior Publication Data

US 2023/0143466 A1 May 11, 2023

(51) Int. Cl.

| | |
|---|---|
| ***H01F 17/04*** | (2006.01) |
| ***H01F 3/10*** | (2006.01) |
| ***H01F 27/26*** | (2006.01) |
| ***H01F 27/28*** | (2006.01) |
| ***H01F 27/30*** | (2006.01) |

(52) U.S. Cl.

CPC ............. *H01F 27/306* (2013.01); *H01F 3/10* (2013.01); *H01F 27/263* (2013.01); *H01F 27/2823* (2013.01)

(58) Field of Classification Search

CPC ..................................................... H01F 27/306

USPC .......................................................... 336/221

See application file for complete search history.

(56) References Cited

U.S. PATENT DOCUMENTS

| | | | | |
|---|---|---|---|---|
| 6,317,021 B1 * | 11/2001 | Jansen | .................... | H01F 27/24 336/215 |
| 2004/0140775 A1 * | 7/2004 | Baumann | ................ | H01F 41/02 315/307 |
| 2012/0081204 A1 * | 4/2012 | Garrity | ................... | H01F 27/24 336/221 |

FOREIGN PATENT DOCUMENTS

| | | | |
|---|---|---|---|
| CN | 201956165 | U | 8/2011 |
| CN | 108933026 | A | 12/2018 |
| CN | 210575455 | U | 5/2020 |
| JP | 61-144626 | U | 9/1986 |
| JP | 11-102819 | A | 4/1999 |
| JP | 2002-203726 | A | 7/2002 |
| JP | 2009-88250 | A | 4/2009 |
| JP | 2014-67907 | A | 4/2014 |
| JP | 2016-9764 | A | 1/2016 |
| JP | 2018-98300 | A | 6/2018 |
| JP | 2020-96099 | A | 6/2020 |
| TW | 584307 | | 4/2004 |

OTHER PUBLICATIONS

English translation of CN201956165 (Year: 2011).*

* cited by examiner

*Primary Examiner* — Ronald Hinson

(74) *Attorney, Agent, or Firm* — Winston Hsu

(57) ABSTRACT

A magnetic component includes a magnetic body and a coil. The magnetic body includes an inner leg, at least one outer leg, a first bottom portion and a second bottom portion. The inner leg and the at least one outer leg protrude from the first bottom portion and the second bottom portion. A cross-sectional area of the inner leg is larger than a total cross-sectional area of the at least one outer leg. The coil is wound around the inner leg.

9 Claims, 8 Drawing Sheets

MAGNETIC COMPONENT AND MAGNETIC BODY THEREOF

BACKGROUND OF THE INVENTION

1. Field of the Invention

The invention relates to a magnetic component and a magnetic body thereof and, more particularly, to a magnetic component and a magnetic body thereof capable of uniformizing magnetic field distribution and improving thermal balance.

2. Description of the Related Art

A magnetic component is an important electric component used for storing energy, converting energy and isolating electricity. In most of circuits, there is always a magnetic component installed therein. In general, the magnetic component mainly comprises a reactor, a transformer and an inductor. The magnetic component usually consists of a magnetic body and at least one coil disposed in the magnetic body. When an electronic device equipped with the magnetic component is operating, heat generated by the magnetic component will be accumulated to make the temperature of the electronic device rise, such that the operating efficiency of the electronic device will be reduced or even the magnetic body may crack. Therefore, how to avoid heat accumulation to improve thermal balance for the magnetic component has become a significant design issue.

SUMMARY OF THE INVENTION

The invention provides a magnetic component and a magnetic body thereof capable of uniformizing magnetic field distribution and improving thermal balance, so as to solve the aforesaid problems.

According to an embodiment of the invention, a magnetic component comprises a magnetic body and a coil. The magnetic body comprises an inner leg, at least one outer leg, a first bottom portion and a second bottom portion. The inner leg and the at least one outer leg protrude from the first bottom portion and the second bottom portion. A cross-sectional area of the inner leg is larger than a total cross-sectional area of the at least one outer leg. The coil is wound around the inner leg.

According to another embodiment of the invention, a magnetic body comprises an inner leg, at least one outer leg and a bottom portion. A cross-sectional area of the inner leg is larger than a total cross-sectional area of the at least one outer leg. The inner leg and the at least one outer leg protrude from the bottom portion.

As mentioned in the above, the invention adjusts and optimizes the cross-sectional areas of the inner leg and the at least one outer leg of the magnetic body to improve the characteristics of the magnetic component. Specifically, the cross-sectional area of the inner leg is larger than the total cross-sectional area of the at least one outer leg. When the structure of the magnetic body conforms to the aforesaid geometric criteria, the magnetic body can uniformize magnetic field distribution and then avoid heat accumulation to improve thermal balance for the magnetic component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
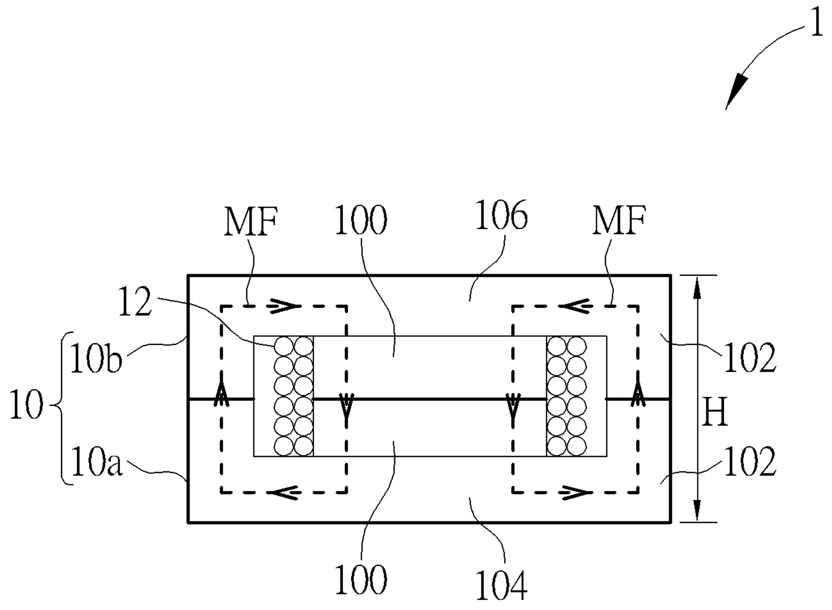
FIG. 1 is a cross-sectional view illustrating a magnetic component according to an embodiment of the invention.
Figure 2:
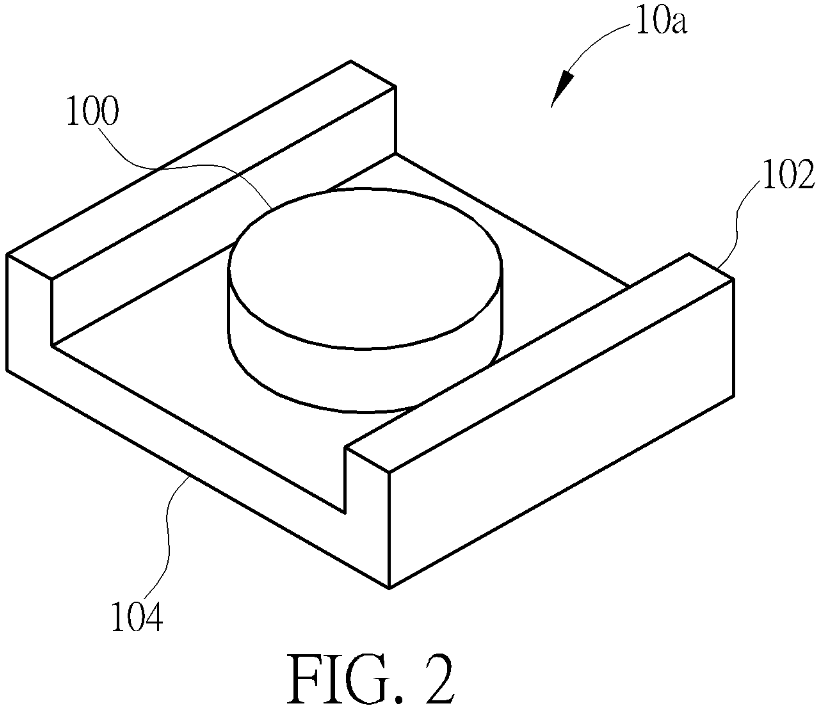
FIG. 2 is a perspective view illustrating a core shown in FIG. 1.
Figure 3:
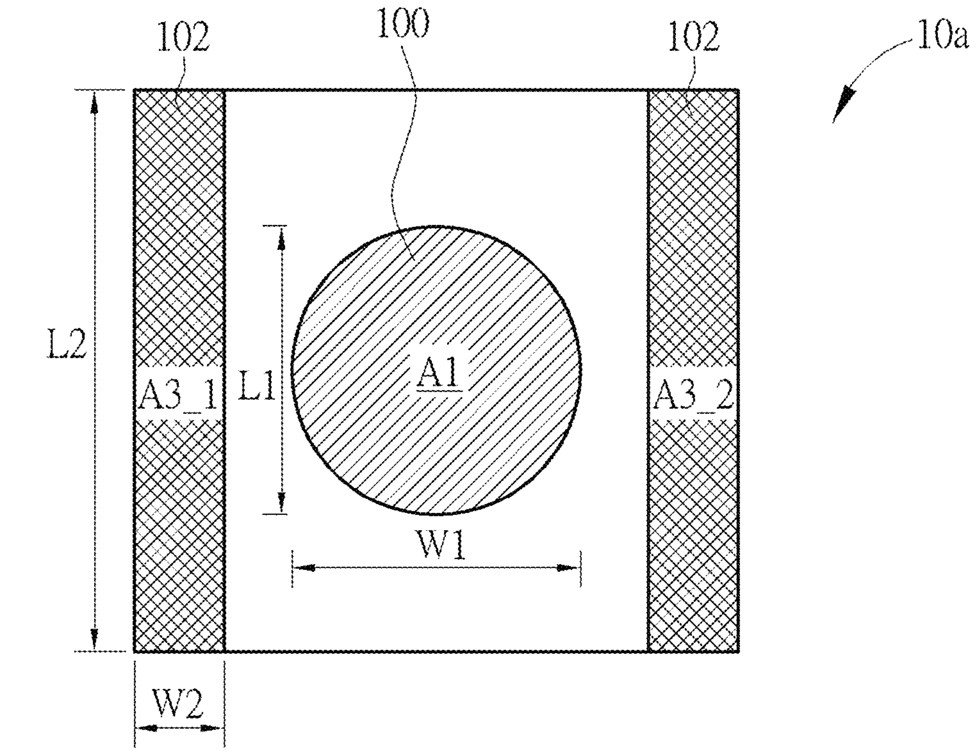
FIG. 3 is a top view illustrating the core shown in FIG. 2.
Figure 4:
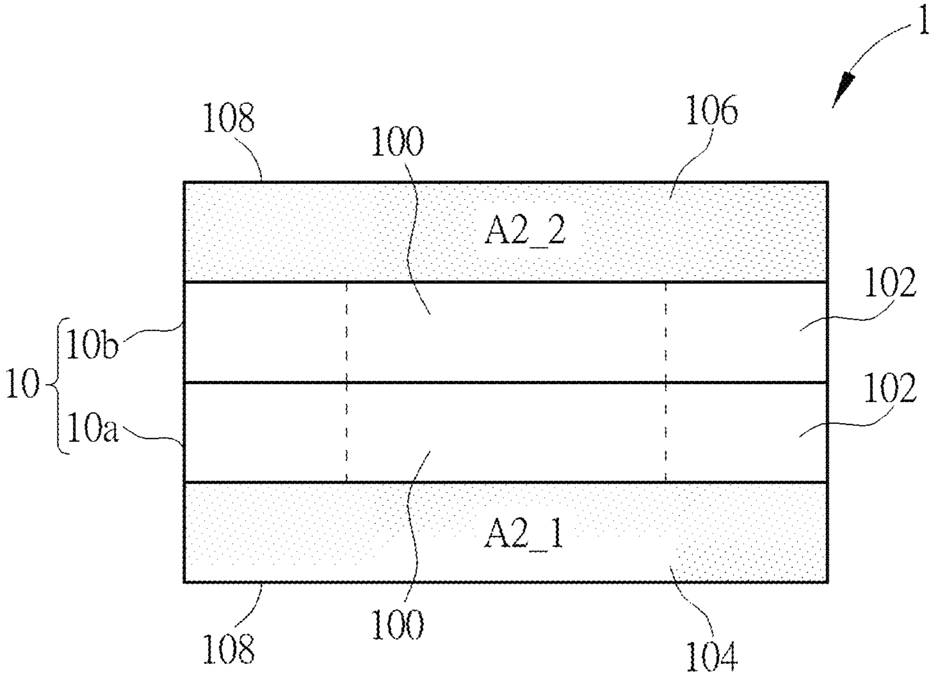
FIG. 4 is a side view illustrating the magnetic component shown in FIG. 1.
Figure 5:
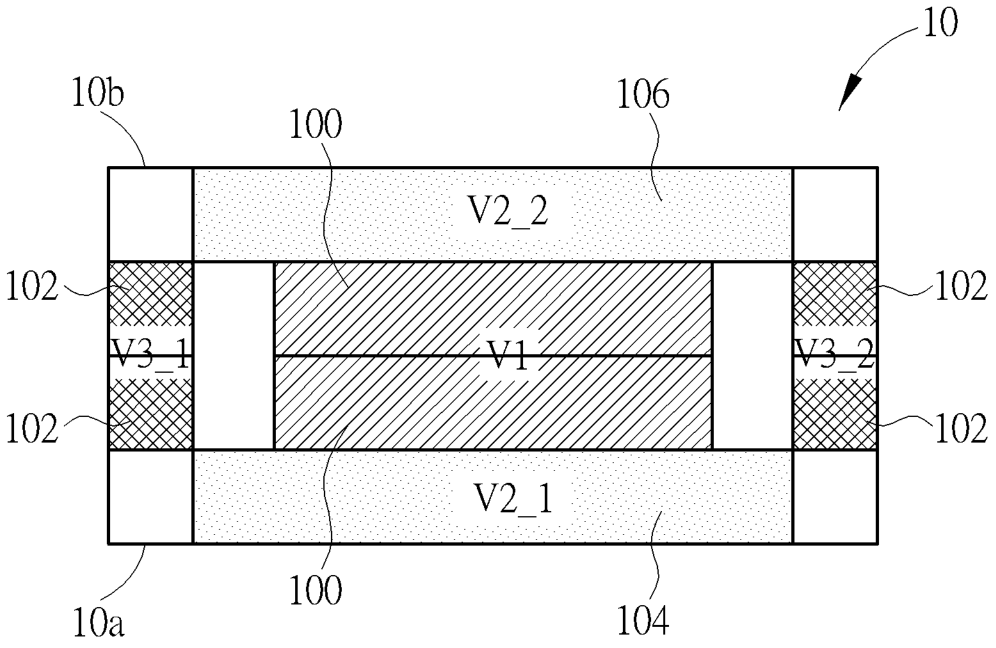
FIG. 5 is a front view illustrating the core shown in FIG. 2.
Figure 6A:
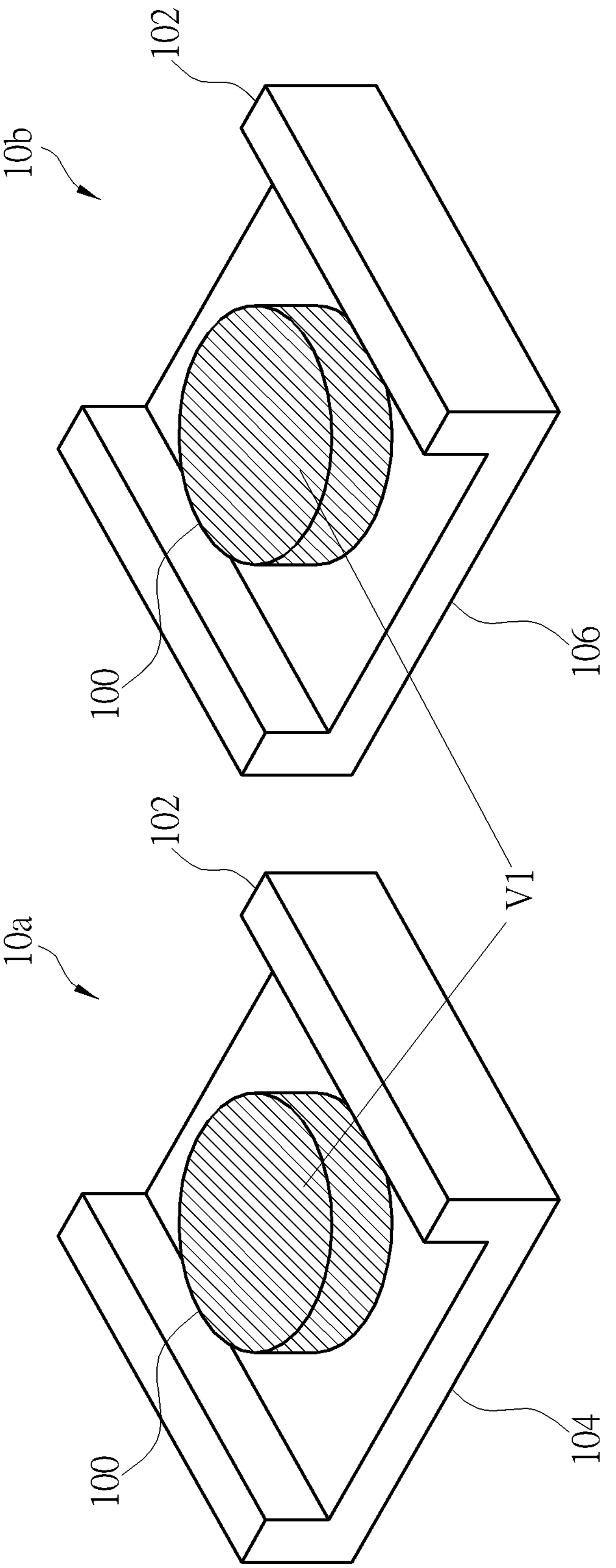
FIG. 6A is a perspective view illustrating a range of a volume of an inner leg shown in FIG. 5.
Figure 6B:
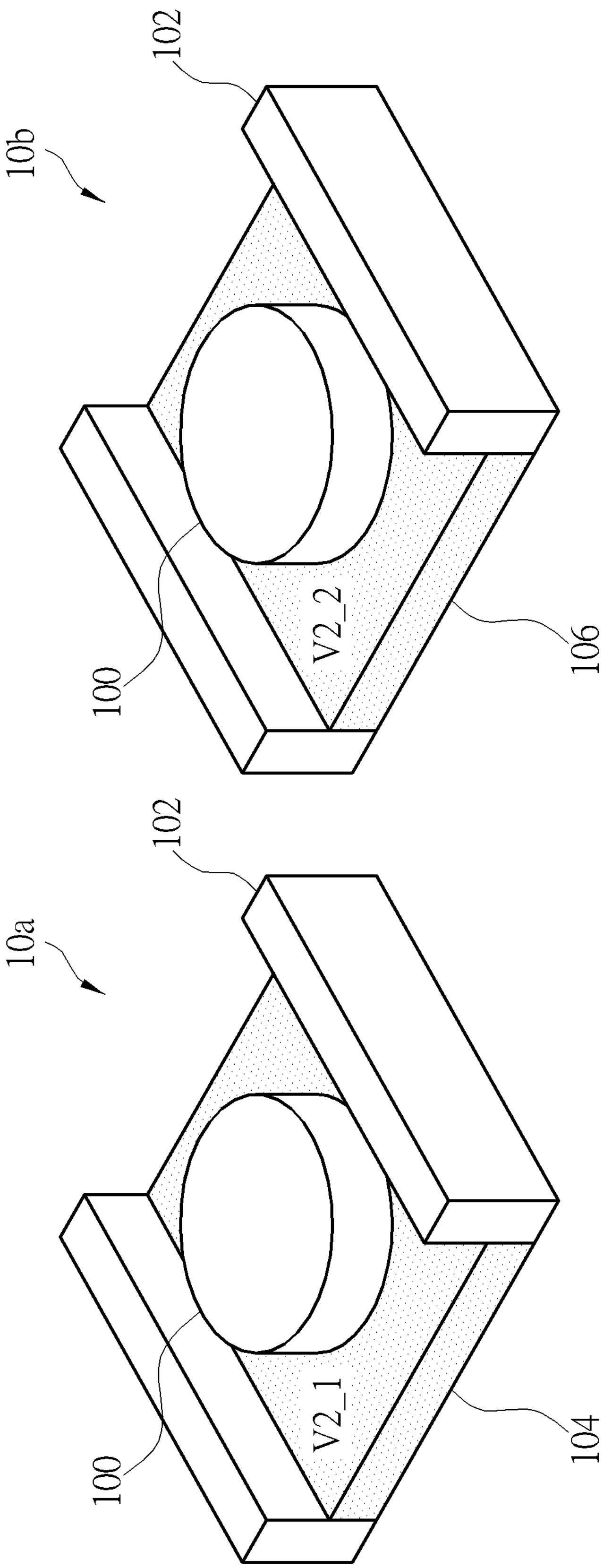
FIG. 6B is a perspective view illustrating the ranges of volumes of a first bottom portion and a second bottom portion shown in FIG. 5.
Figure 6C:
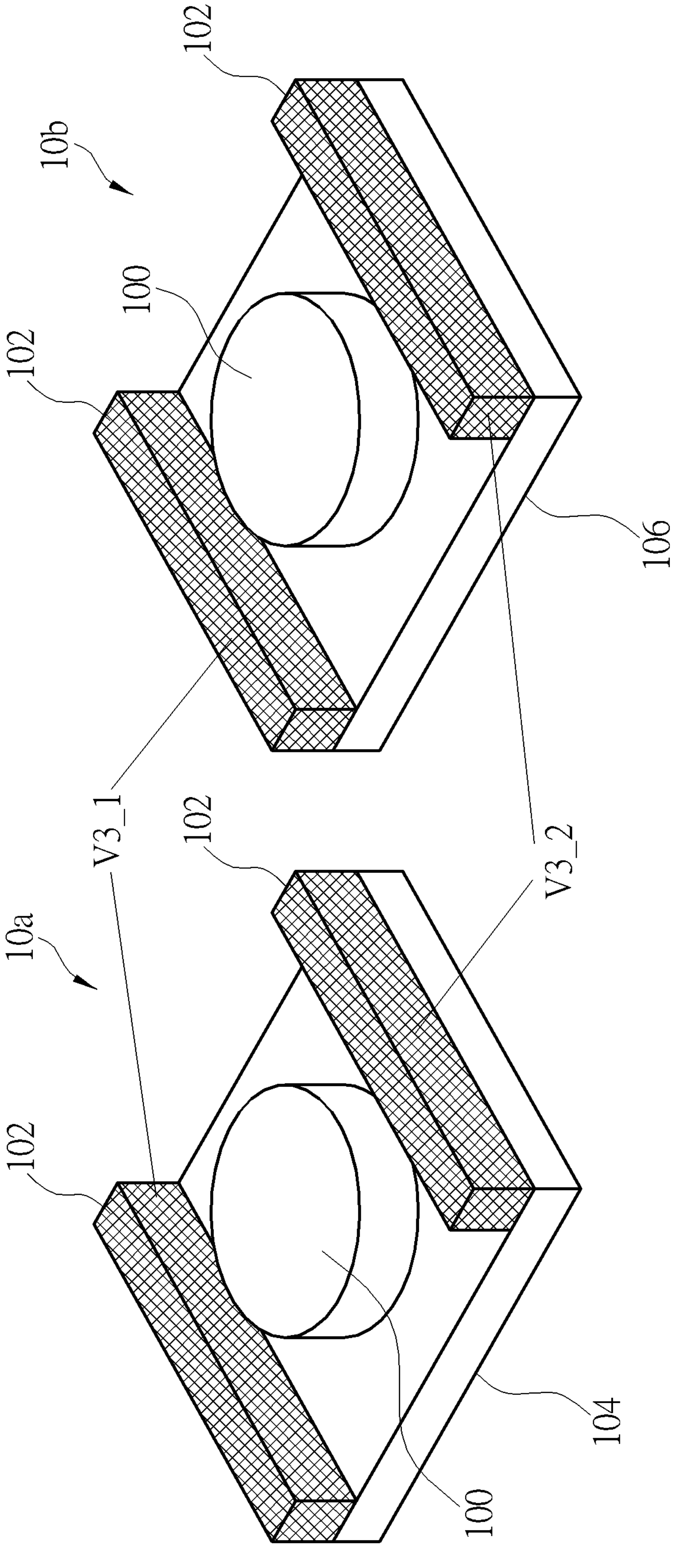
FIG. 6C is a perspective view illustrating the ranges of volumes of two outer legs shown in FIG. 5.

Referring to FIGS. 1 to 6C, FIG. 1 is a cross-sectional view illustrating a magnetic component 1 according to an embodiment of the invention, FIG. 2 is a perspective view illustrating a core **10*a* shown in FIG. 1, FIG. 3 is a top view illustrating the core 10*a* shown in FIG. 2, FIG. 4 is a side view illustrating the magnetic component 1 shown in FIG. 1, FIG. 5 is a front view illustrating the core 10*a* shown in FIG. 2, FIG. 6A is a perspective view illustrating a range of a volume V1 of an inner leg 100 shown in FIG. 5, FIG. 6B is a perspective view illustrating the ranges of volumes V2_1, V2_2 of a first bottom portion 104 and a second bottom portion 106 shown in FIG. 5, and FIG. 6C is a perspective view illustrating the ranges of volumes V3_1, V3_2 of two outer legs 102 shown in FIG. 5**.

The magnetic component 1 of the invention may be a reactor, a transformer, an inductor or other magnetic components. As shown in FIG. 1, the magnetic component 1 comprises a magnetic body 10 and a coil 12. The magnetic body 10 comprises an inner leg 100, at least one outer leg 102, a first bottom portion 104 and a second bottom portion 106. Preferably, the first bottom portion 104 and the second bottom portion 106 may be plate structures and the magnetic body 10 may be a symmetric structure. The magnetic body 10 may be formed in one-piece or consists of a plurality of cores. In this embodiment, the magnetic body 10 may consist of two E cores **10*a*, 10*b*, but the invention is not so limited. The number and type of the cores of the magnetic body 10 may be determined according to practical applications. For example, the core of the magnetic body 10 may be E core, EFD core, EPC core, PQ core, EC core, low profile core, POT core, ETD core, EP core, RM core, solid center post RM core, and so on. In this embodiment, the cores 10*a*, 10*b* have identical structure and FIGS. 2 and 3 only show the core 10*a* for illustration purpose. However, in another embodiment, the cores 10*a*, 10*b*** may have different structures.

In this embodiment, the magnetic body 10 may comprise a plurality of outer legs 102, but the invention is not so limited. As shown in FIG. 1, the magnetic body 10 comprises two outer legs 102 and the inner leg 100 is disposed between the two outer legs 102, wherein the inner leg 100 and the two outer legs 102 protrude from the first bottom portion 104 and the second bottom portion 106. In this embodiment, the core 10*a* comprises a part of the inner leg 100, parts of the two outer legs 102 and the first bottom portion 104, and the core 10*b* comprises a part of the inner leg 100, parts of the two outer legs 102 and the second bottom portion 106. However, in another embodiment, the cores 10*a*, 10*b* may also have one single outer leg 102 according to practical applications.

In this embodiment, the coil 12 is wound around the inner leg 100 and there is no coil wound around the outer leg 102. A magnetic flux MF generated by the coil 12 wound around the inner leg 100 passes through cross-sectional areas of the inner leg 100, the first bottom portion 104, the outer leg 102 and the second bottom portion 106 in sequence. Furthermore, a gap may exist between the inner legs 100 or/and the outer legs 102 of the cores 10*a*, 10*b* according to practical applications.

In this embodiment, a cross-sectional area of the inner leg 100 is larger than a total cross-sectional area of the outer leg 102. As shown in FIG. 3, the cross-sectional area of the inner leg 100 is defined as A1, and the cross-sectional areas of the two outer legs 102 are defined as A3_1, A3_2. Thus, the cross-sectional areas of the inner leg 100 and the two outer legs 102 conform to the following inequality: A1>A3_1+A3_2. It should be noted that the aforesaid inequality (A1>A3_1+A3_2) is adapted to the magnetic body 10 with two outer legs 102. When the structure of the magnetic body 10 conforms to the aforesaid geometric criteria, the magnetic body 10 can uniformize magnetic field distribution and then avoid heat accumulation to improve thermal balance for the magnetic component 1.

It should be noted that the number of the at least one outer leg 102 may be equal to N (N is a positive integer) and the cross-sectional areas of the inner leg 100 and the cross-sectional areas of the N outer legs 102 may be defined as A3_1, . . . , A3_N. Thus, the N outer legs 102 conform to the following inequality: A1>A3_1+ . . . +A3_N. In another embodiment, if the number of the at least one outer leg 102 is equal to 1, the cross-sectional areas of the inner leg 100 and the outer leg 102 conform to the following inequality: A1>A3_1. In another embodiment, if the number of the at least one outer leg 102 is equal to 4, the cross-sectional areas of the inner leg 100 and the four outer legs 102 conform to the following inequality: A1>A3_1+A3_2+A3_3+A3_4.

In this embodiment, the cross-sectional area of the inner leg 100 is larger than the total cross-sectional area of the two outer legs 102. Preferably, from the viewing angle shown in FIG. 3, a length-to-width ratio L1/W1 of the inner leg 100 is between 1 and 10, and a length-to-width ratio L2/W2 of the outer leg 102 is between 1 and 10. In another embodiment, the length-to-width ratio L1/W1 of the inner leg 100 may be between 1 and 8, and the length-to-width ratio L2/W2 of the outer leg 102 may be between 1 and 8. In this embodiment, a height of the magnetic body 10 may be between 22 mm and 152 mm (i.e. the height of each of the two cores 10*a*, 10*b* may be between 11 mm and 76 mm). Accordingly, the effect of the invention may be more outstanding.

In another embodiment, the cross-sectional area of the inner leg 100 may be further larger than an effective cross-sectional area of the magnetic body 10. When a number of the at least one outer leg 102 is equal to N (N is a positive integer), the effective cross-sectional area of the magnetic body 10 may be obtained by Aeff=(A1*V1+A2_1*V2_1+A2_2*V2_2+A3_1*V3_1+ . . . +A3_N*V3_N)/((V1*N+V2_1+V2_2+V3_1+ . . . +V3_N)/N), wherein Aeff represents the effective cross-sectional area, A1 represents the cross-sectional area of the inner leg 100 (as shown in FIG. 3), A2_1 represents a cross-sectional area of the first bottom portion 104 (as shown in FIG. 4), A2_2 represents a cross-sectional area of the second bottom portion 106 (as shown in FIG. 4), A3_N represents a cross-sectional area of an N-th outer leg of the N outer legs 102 (as shown in FIG. 3), V1 represents a volume of the inner leg 100 (as shown in FIGS. 5 and 6A), V2_1 represents a volume of the first bottom portion 104 (as shown in FIGS. 5 and 6B), V2_2 represents a volume of the second bottom portion 106 (as shown in FIGS. 5 and 6B), and V3_N represents a volume of the N-th outer leg of the N outer legs 102 (as shown in FIGS. 5 and 6C). In this embodiment, the number of the at least one outer leg 102 is equal to 2 (i.e. N=2), so Aeff=(A1*V1+A2_1*V2_1+A2_2*V2_2+A3_1*V3_1+A3_2*V3_2)/((V1*2+V2_1+V2_2+V3_1+V3_2)/2). In another embodiment, if the number of the at least one outer leg 102 is equal to 1 (i.e. N=1), Aeff=(A1*V1+A2_1*V2_1+A2_2*V2_2+A3_1*V3_1)/((V1*1+V2_1+V2_2+V3_1)/1). In another embodiment, if the number of the at least one outer leg 102 is equal to 4 (i.e. N=4), Aeff=(A1*V1+A2_1*V2_1+A2_2*V2_2+A3_1*V3_1+A3_2*V3_2+A3_3*V3_3+A3_4*V3_4)/((V1*4+V2_1+V2_2+V3_1+V3_2+V3_3+V3_4)/4).

In this embodiment, for example, provided that A1 is equal to 530 $mm^2$, A2_1 is equal to 262 $mm^2$, A2_2 is equal to 220 $mm^2$, A3_1 is equal to 260 $mm^2$, A3_2 is equal to 220 $mm^2$, V1 is equal to 14861 $mm^3$, V2_1 is equal to 6064 $mm^3$, V2_2 is equal to 5091.9 $mm^3$, V3_1 is equal to 4974 $mm^3$, and V3_2 is equal to 4208.8 $mm^3$, Aeff will be equal to 511.56 $mm^2$ through the aforesaid equation. When the structure of the magnetic body 10 further conforms to the aforesaid geometric criteria, the magnetic body 10 can also uniformize magnetic field distribution and then avoid heat accumulation to improve thermal balance for the magnetic component 1. In the aforesaid inequality and equation, when A2_1 is equal to A2_2 or/and A3_1 is equal to A3_2, the thermal stress will be further reduced.

In another embodiment, the cross-sectional area of the inner leg 100 may be further larger than a total cross-sectional area of the first bottom portion 104 and the second bottom portion 106. As shown in FIG. 3, the cross-sectional area of the inner leg 100 is defined as A1. As shown in FIG. 4, the cross-sectional area of the first bottom portion 104 is defined as A2_1 and the cross-sectional area of the second bottom portion 106 is defined as A2_2. Thus, the cross-sectional areas of the inner leg 100, the first bottom portion 104 and the second bottom portion 106 conform to the following inequality: A1>A2_1+A2_2. It should be noted that the cross-sectional area of the inner leg 100 may also be equal to the total cross-sectional area of the first bottom portion 104 and the second bottom portion 106 (i.e. A1=A2_1+A2_2), but it is preferred to use A1>A2_1+A2_2. Furthermore, if the first bottom portion 104 and the second bottom portion 106 have identical cross-sectional area, the cross-sectional area of the inner leg 100 will be larger than two times the cross-sectional area of the first bottom portion 104 or the second bottom portion 106 (i.e. A1>2*A2_1 or A1>2*A2_2). When the structure of the magnetic body 10 conforms to the aforesaid geometric criteria, the magnetic body 10 can uniformize magnetic field distribution and then avoid heat accumulation to improve thermal balance for the magnetic component 1.

Referring to tables 1 and 2 below, tables 1 and 2 show several effect comparisons between the original structure and the improved structure of the invention. In table 2, AB represents differential magnetic distribution and ΔT represents differential temperature, wherein AB is the difference between the magnetic field density B1 of the inner leg 100 and the magnetic field density B3 of the outer leg 102. As shown in tables 1 and 2, it is obvious that the invention can uniformize magnetic field distribution and then avoid heat accumulation to improve thermal balance for the magnetic component 1 indeed.

TABLE 1

| | | Aeff | A1 | A2_1 | A2_2 | A3_1 | A3_2 |
|---|---|---|---|---|---|---|---|
| Example 1 | Original structure | 540 | 508 | 288 | 288 | 254 | 254 |
| | Improved structure | 509 | 508 | 285 | 285 | 160 | 160 |
| Example 2 | Original structure | 535 | 457 | 305 | 305 | 261.5 | 261.6 |
| | Improved structure | 553 | 542 | 312 | 312 | 223 | 223 |
| Example 3 | Original structure | 540 | 510 | 280 | 280 | 260 | 260 |
| | Improved structure | 526 | 530 | 262 | 262 | 260 | 260 |
| Example 4 | Original structure | 527 | 457 | 288 | 288 | 262 | 262 |
| | Improved structure | 545 | 542 | 255 | 255 | 291 | 291 |
| Example 5 | Original structure | 527 | 457 | 288 | 288 | 262 | 262 |
| | Improved structure | 531 | 542 | 289 | 289 | 223 | 223 |

TABLE 2

| | | A1/ (A2_1 + A2_2) | A1/ (A3_1 + A3_2) | After 10 minutes $\Delta B$= B1 − B3 | After 10 minutes $\Delta T$ | Geometric criteria |
|---|---|---|---|---|---|---|
| Example 1 | Original structure | 0.88 | 1.00 | 42.5 | 8 | A1 = (A3_1 + A3_2) |
| | Improved structure | 0.89 | 1.59 | −28.2 | 1 | A1 > (A3_1 + A3_2) A1≈Aeff B1 < B3 |
| Example 2 | Original structure | 0.75 | 0.87 | 14 | 36 | |
| | Improved structure | 0.87 | 1.22 | −13.45 | 15 | A1 > (A3_1 + A3_2) B1 < B3 |
| Example 3 | Original structure | 0.91 | 0.98 | 42.5 | 110 | |
| | Improved structure | 1.01 | 1.02 | 34.55 | 70 | A1 > (A2_1 + A2_2) A1 > (A3_1 + A3_2) A1 > Aeff |
| Example 4 | Original structure | 0.79 | 0.87 | 14 | 36 | |
| | Improved structure | 1.06 | 0.93 | 6.6 | 20 | A1 > (A2_1 + A2_2) |
| Example 5 | Original structure | 0.79 | 0.87 | 14 | 36 | |
| | Improved structure | 0.94 | 1.22 | −13.45 | 15 | A1 > (A3_1+ A3_2) A1 > Aeff B1 < B3 |

In table 2, $\Delta B$ is the difference between the magnetic field density B1 of the inner leg 100 and the magnetic field density B3 of the outer leg 102. Once the absolute value of $\Delta B$ (i.e. $|\Delta B|$) decreases or B1 is smaller than B3, the differential temperature $\Delta T$ and the thermal stress will decrease correspondingly.

In another embodiment, the first bottom portion 104 or the second bottom portion 106 may comprise a heat dissipating surface 108 for in contact with a heat dissipating module (not shown) for heat dissipation. If the heat dissipating surface 108 of the first bottom portion 104 is in contact with a heat dissipating module for heat dissipation, the cross-sectional area of the first bottom portion 104 may be smaller than the cross-sectional area of the second bottom portion 106. Alternatively, if the heat dissipating surface 108 of the second bottom portion 106 is in contact with a heat dissipating module (not shown) for heat dissipation and the cross-sectional area of the second bottom portion 106 may be smaller than the cross-sectional area of the first bottom portion 104.

Figure 7:
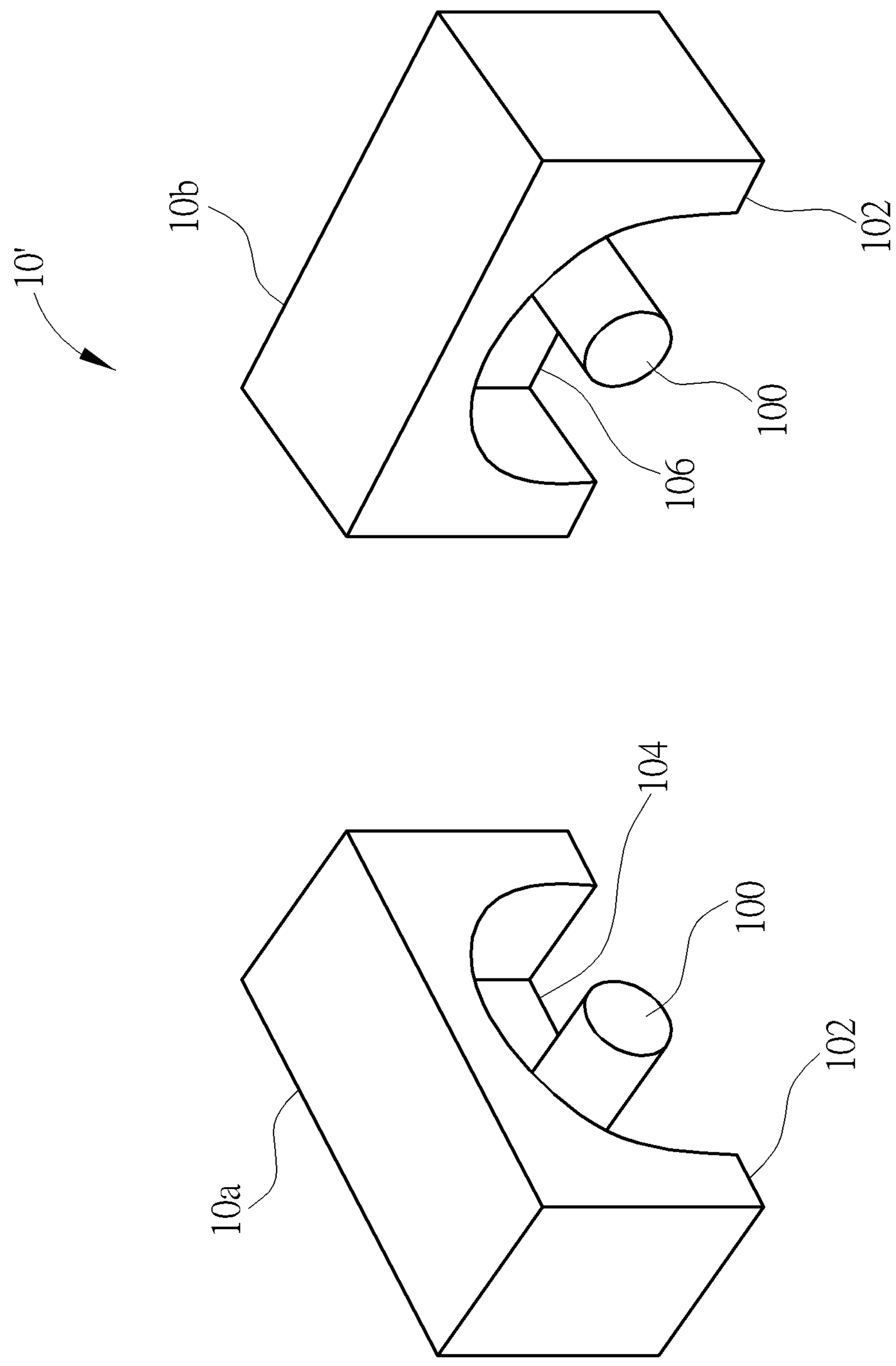
FIG. 7 is a perspective view illustrating a magnetic body according to another embodiment of the invention.
Figure 8:
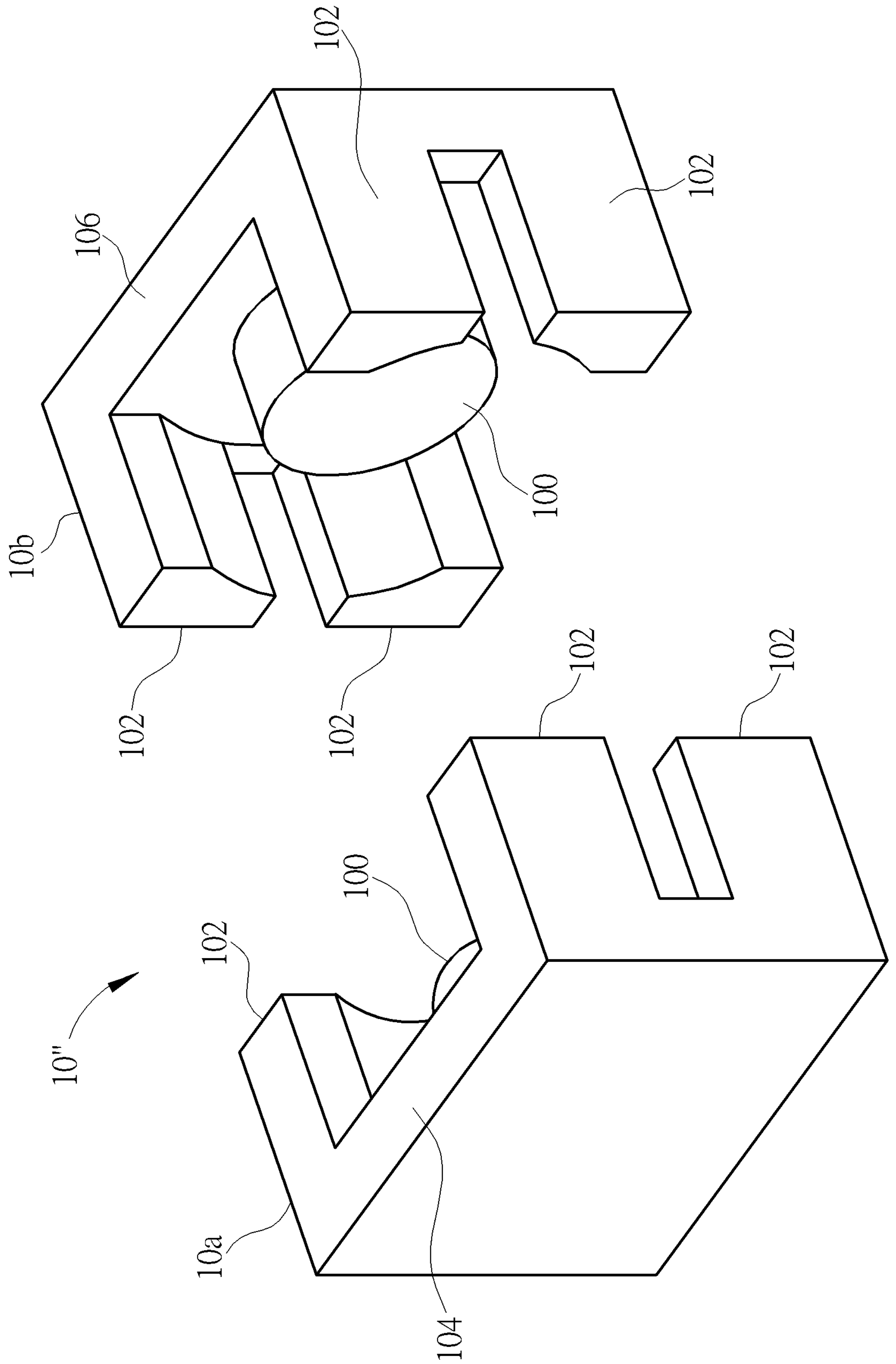
FIG. 8 is a perspective view illustrating a magnetic body according to another embodiment of the invention.

Referring to FIGS. 7 and 8, FIG. 7 is a perspective view illustrating a magnetic body 10' according to another embodiment of the invention and FIG. 8 is a perspective view illustrating a magnetic body 10" according to another embodiment of the invention.

As shown in FIG. 7, the magnetic body 10' comprises one outer leg 102. As shown in FIG. 8, the magnetic body 10" comprises four outer legs 102. The thermal stress corresponding to the magnetic bodies 10, 10' and 10" may be reduced by 50%, 30% and 55% respectively. It should be noted that, for the magnetic body 10" shown in FIG. 8, the cross-sectional area of the inner leg 100 is larger than the total cross-sectional area of the four outer legs 102. Furthermore, a ratio between the cross-sectional area of the inner leg 100 and the total cross-sectional area of the outer leg(s) 102 may be between 1.01 and 1.6, such that the thermal stress will be further reduced.

In an embodiment, the cross-sectional area of the inner leg 100 may be a minimum value along a height direction of the inner leg 100 (i.e. the direction of H shown in FIG. 1) and the total cross-sectional area of the two outer legs 102 may be a minimum value along a height direction of the two outer legs 102 (i.e. the direction of H shown in FIG. 1).

In another embodiment, the cross-sectional area of the inner leg 100 may be identical along a height direction of the inner leg 100 (i.e. the direction of H shown in FIG. 1) and the total cross-sectional area of the two outer legs 102 may be identical along a height direction of the two outer legs 102 (i.e. the direction of H shown in FIG. 1), such that the manufacturing cost can be reduced.

As mentioned in the above, the invention adjusts and optimizes the cross-sectional areas of the inner leg and the at least one outer leg of the magnetic body to improve the characteristics of the magnetic component. Specifically, the cross-sectional area of the inner leg is larger than the total cross-sectional area of the at least one outer leg. Furthermore, the cross-sectional area of the inner leg may be larger than the effective cross-sectional area of the magnetic body and/or the cross-sectional area of the inner leg may be larger than the total cross-sectional area of the first bottom portion and the second bottom portion. When the structure of the magnetic body conforms to the aforesaid geometric criteria, the magnetic body can uniformize magnetic field distribution and then avoid heat accumulation to improve thermal balance for the magnetic component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic component comprising:

a magnetic body comprising an inner leg, a plurality of outer legs, a bottom portion and a top portion, the inner leg and the plurality of outer legs protruding from the bottom portion and the top portion, a cross-sectional area of the inner leg being larger than a total cross-sectional area of the plurality of outer legs, the cross-sectional area of the inner leg and the total cross-sectional area of the plurality of outer legs being perpendicular to a protruding direction of the plurality of outer legs and the inner leg; and a coil wound around the inner leg;

wherein the cross-sectional area of the inner leg is larger than an effective cross-sectional area of the magnetic body, a number of the plurality of outer legs is equal to N, N is a positive integer larger than one, the effective cross-sectional area is obtained by: Aeff=(A1*V1+A2_1*V2_1+A2_2*V2_2+A3_1*V3_1+ . . . +A3_N*V3_N)/((V1*N+V2_1+V2_2+V3_1+ . . . +V3_N)/N), wherein Aeff represents the effective cross-sectional area, A1 represents the cross-sectional area of the inner leg, A2_1 represents a cross-sectional area of the bottom portion, A2_2 represents a cross-sectional area of the top portion, A3_N represents a cross-sectional area of an N-th outer leg of the plurality of outer legs, V1 represents a volume of the inner leg, V2_1 represents a volume of the bottom portion, V2_2 represents a volume of the top portion, and V3_N represents a volume of the N-th outer leg of the plurality of outer legs;

wherein the bottom portion comprises a heat dissipating surface and the cross-sectional area of the inner leg is larger than a total cross-sectional area of the bottom portion and the top portion.

2. The magnetic component of claim 1, wherein a height of the magnetic body is between 22 mm and 152 mm.

3. The magnetic component of claim 1, wherein a ratio between the cross-sectional area of the inner leg and the total cross-sectional area of the plurality of outer legs is between 1.01 and 1.6.

4. The magnetic component of claim 1, wherein a magnetic flux generated by the coil wound around the inner leg passes through cross-sectional areas of the inner leg, the bottom portion, the plurality of outer legs and the top portion in sequence.

5. The magnetic component of claim 1, wherein the inner leg is disposed between the plurality of outer legs, and the cross-sectional area of the inner leg is larger than the total cross-sectional area of the plurality of outer legs.

6. The magnetic component of claim 1, wherein a length-to-width ratio of the inner leg is between 1 and 10, and a length-to-width ratio of the plurality of outer legs is between 1 and 10.

7. The magnetic component of claim 1, wherein the cross-sectional area of the inner leg is a minimum value along a height direction of the inner leg and the total cross-sectional area of the plurality of outer legs is a minimum value along a height direction of the plurality of outer legs.

8. The magnetic component of claim 1, wherein the cross-sectional area of the inner leg is identical along a height direction of the inner leg and the total cross-sectional area of the plurality of outer legs is identical along a height direction of the plurality of outer legs.

9. The magnetic component of claim 1, wherein there is no coil wound around the plurality of outer legs.

* * * * *